A. BISHOP.
POP CORN CANDY MIXER.
APPLICATION FILED MAR. 18, 1921.
1,404,338.
Patented Jan. 24, 1922.
3 SHEETS—SHEET 1.
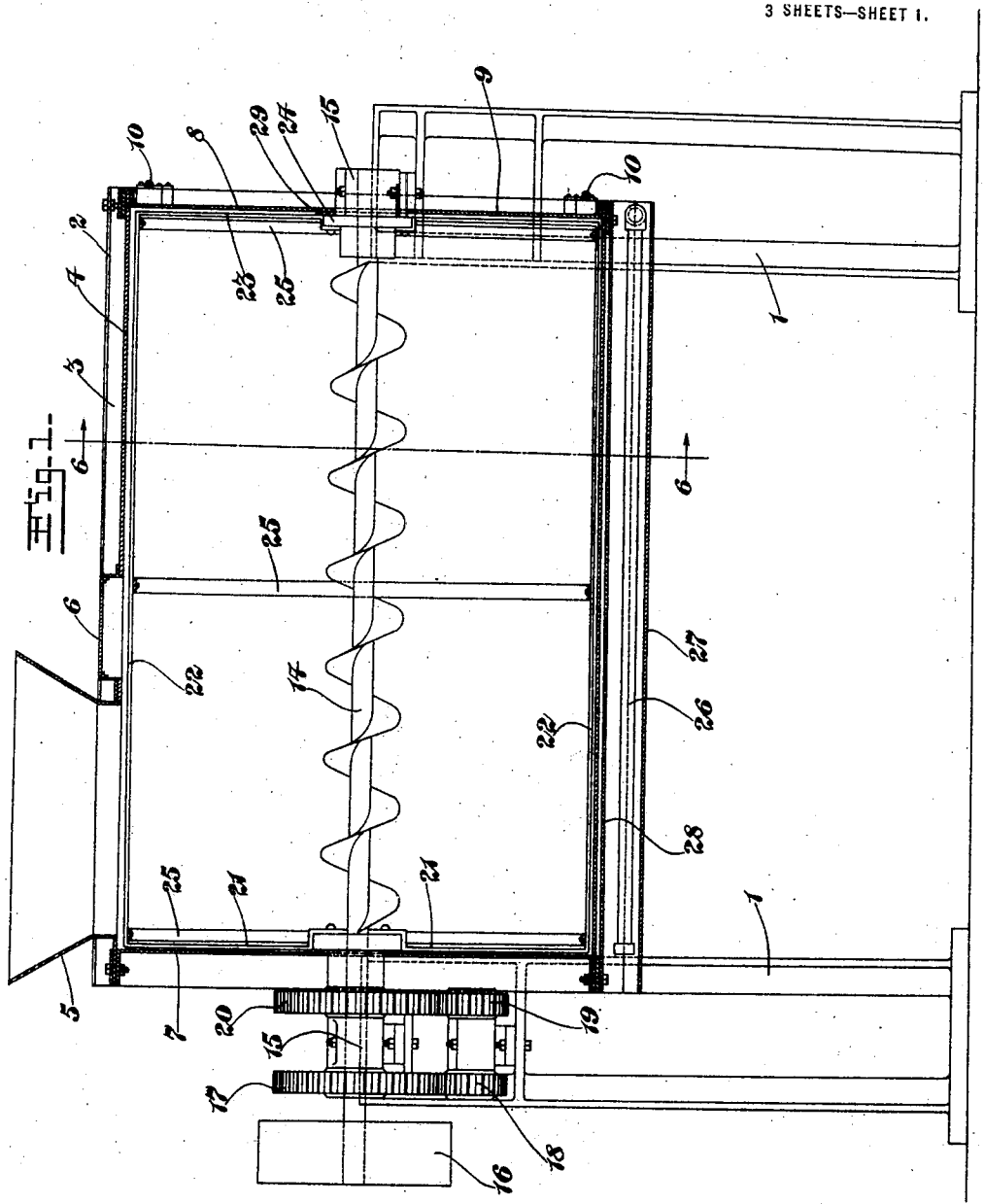
Inventor.
Addison Bishop,
by Rippey & Kingsland,
His Attorneys.

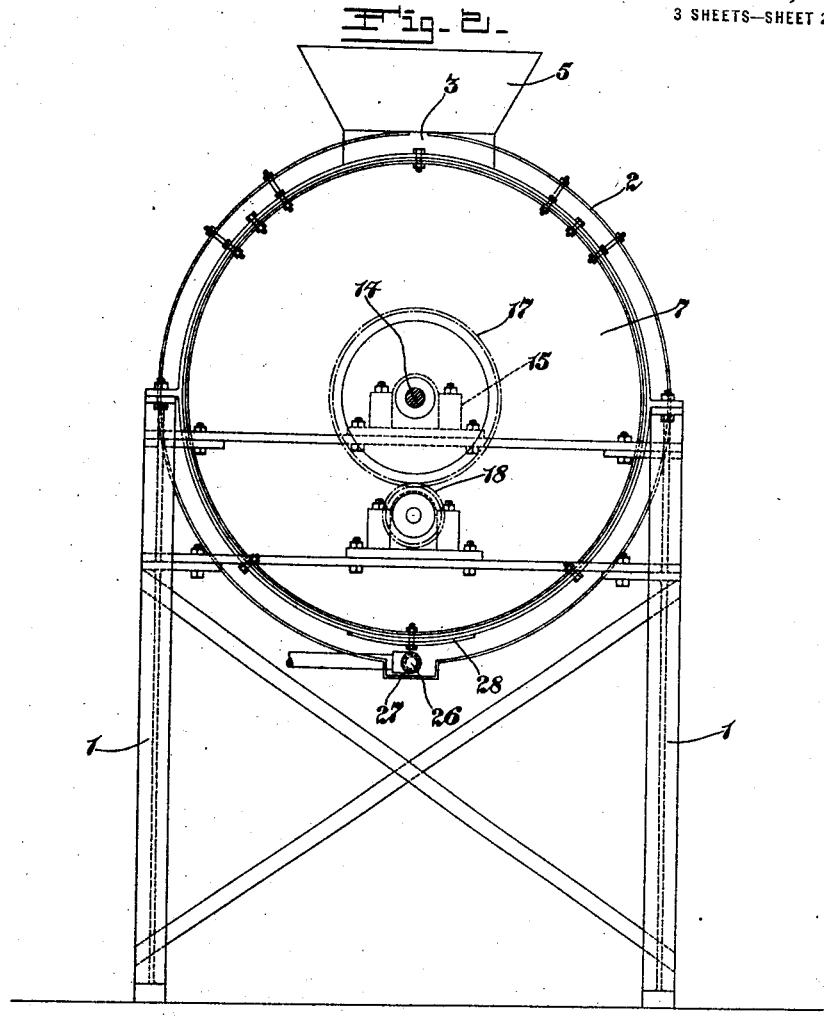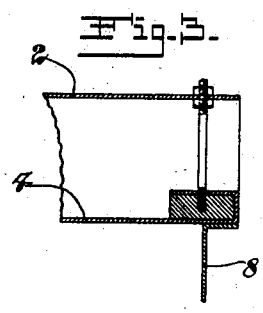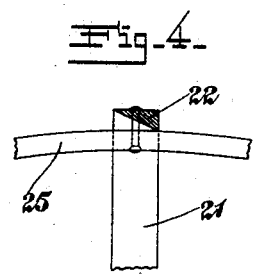

A. BISHOP.
POP CORN CANDY MIXER.
APPLICATION FILED MAR. 18, 1921.
1,404,338.
Patented Jan. 24, 1922.
3 SHEETS—SHEET 3.
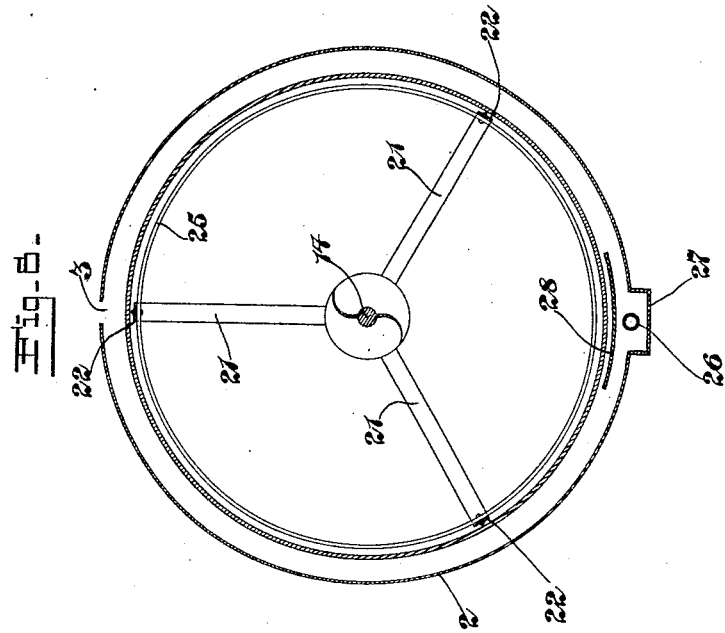
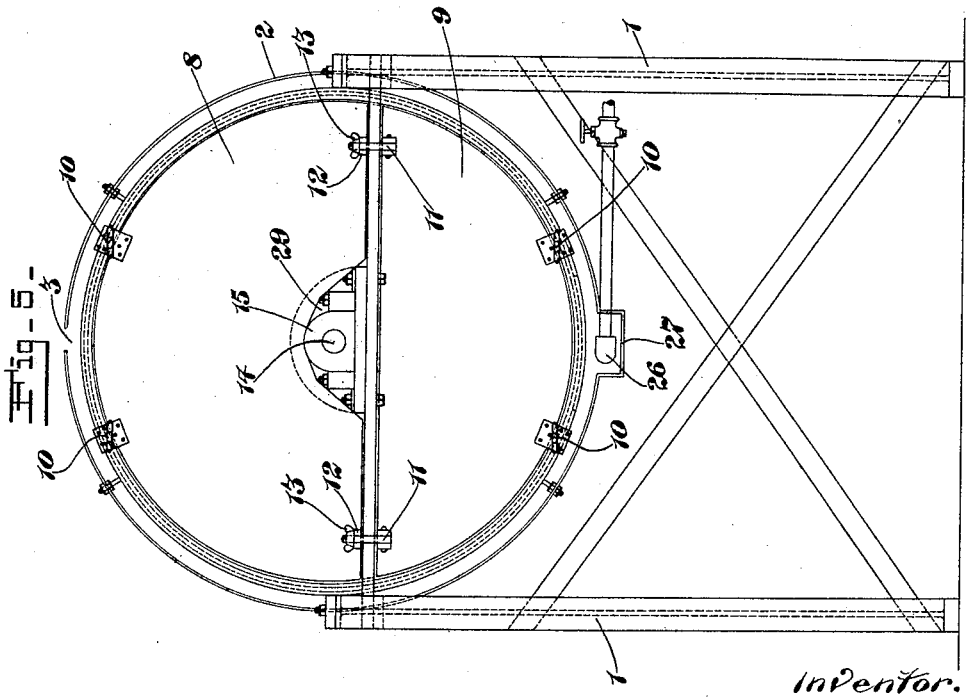
Inventor.
Addison Bishop,
by Rippey & Kingsland,
His Attorneys.

UNITED STATES PATENT OFFICE.

ADDISON BISHOP, OF ST. LOUIS, MISSOURI.

POP-CORN-CANDY MIXER.

1,404,338. Specification of Letters Patent. Patented Jan. 24, 1922.

Application filed March 18, 1921. Serial No. 453,253.

*To all whom it may concern:*

Be it known that I, ADDISON BISHOP, a citizen of the United States, residing at the city of St. Louis and State of Missouri, have invented a new and useful Pop-Corn-Candy Mixer, of which the following is a specification.

This invention relates to popcorn candy mixers.

An object of the invention is to provide a novel and improved machine for mixing popcorn candy.

Another object of the invention is to provide a machine of the character mentioned with agitators and stirrers operating in a novel and efficient manner to effect the mixing of the popcorn and candy.

Other objects will appear from the following description, without specific mention, reference being made to the drawing in which—

Fig. 1 is a vertical sectional view of the machine embodying the principles of my present invention.

Fig. 2 is an end elevation of the machine.

Fig. 3 is an enlarged detail view showing the manner in which some of the parts of the machine are held in proper position.

Fig. 4 is an enlarged sectional view showing the preferred formation of one of the agitators or stirrers.

Fig. 5 is an end elevation showing the end of the machine opposite from that shown in Fig. 2.

Fig. 6 is a sectional view on the line 6—6 of Fig. 1.

My improved machine is supported upon a frame work of proper construction comprising end frames 1. Upon the end frames 1 a heat confining jacket is stationarily supported, the same comprising a confining wall 2 enclosing part of the operating mechanism and confining the heat to maintain the popcorn and candy in a heated condition while they are being mixed. An opening 3 extends along the upper side of the heat confining wall 2 to permit the heated air to pass therefrom. A cylinder 4 is supported within the heat confining jacket and is provided with a hopper 5 through which the popcorn and candy are delivered into the machine. A window 6 is preferably provided at one side of the hopper 5, so that the operator of the machine may conveniently observe the interior thereof. The cylinder 4 is provided with an end wall 7 bolted or otherwise secured to the cylinder near one end thereof. The opposite end of the cylinder consists of an upper door 8 and a lower door 9, said doors being pivotally supported in connection with the cylinder by appropriate hinges 10. The doors may be held closed to form an end wall for the cylinder by any suitable retaining elements such, for instance, as the bolts 11 pivoted to one of the doors and movable between the bifurcated arms of brackets 12 in connection with the other door. Clamping nuts 13 on the bolts 11 may be adjusted to catch the brackets 12 to effect binding engagement as required to hold the doors closed. When it is desired to remove the mixed popcorn and candy the doors may be opened.

The mixing or agitating devices are supported within the cylinder 4. The shaft of a screw agitator 14 extends axially through the cylinder 4 and is journaled for rotation in bearings 15 on the frames 1. The agitator 14 is rotated in a direction to draw the popcorn and candy toward the end of the cylinder at which the hopper 5 is located, which is away from the doors 8 and 9.

A pulley 16 for receiving a driving belt is on the end of the shaft of the screw 14 and constitutes means for rotating said shaft in the direction and for the purposes mentioned. A gear wheel 17 is fast on said shaft and meshes with a small gear 18 rigidly united with another small gear 19, the latter meshing with a gear 20 loosely supported on the shaft of the screw 14. The hub of the gear 20 extends through the end wall 7 of the cylinder and supports a number of radial arms 21 whose outer ends are united with stirrer or agitator members 22 extending toward the opposite end of the cylinder at a slight distance from the cylinder wall and in a slightly spiral direction. The opposite ends of the stirrer or agitator members 22 are united with radial arms 23 in connection with a rotary member 24 supported on the shaft of the screw 14. The stirrer or agitator members 22 do not extend exactly parallel with the axis of the cylinder or with the agitator 14, but they extend in a slightly spiral or oblique direction from one end of the cylinder to the other, so that the ends of the agitators 22 which are adjacent the feeding-in end of the cylinder are slightly in advance of the ends of said agitators that are near the doors 8 and 9.

A number of annular supports or hoops 25 are secured to the agitators 22 and constitute strengthening reinforcements therefor. The forward edges of the agitators 22 are comparatively thin as will be understood by reference to Fig. 4, this construction permitting the agitators to function properly without breaking or crushing the popcorn in the machine.

The device for supplying heat to the machine consists of a burner 26, extending longitudinally within a depressed portion 27 of the heat confining wall 2. A baffle 28 is supported between the burner and the lower portion of the wall of the cylinder 4 to deflect the heat and prevent the cylinder from becoming overheated. The heat is thus caused to pass upwardly at both sides of the cylinder and is discharged through the opening 6 along the top of the heat confining wall. Moreover, the space between the heat confining wall and the cylinder is open at both ends to permit proper circulation of air.

In the operation the agitators 14 and 22 are turned in the same direction, their tendency being to draw the popcorn toward the feeding-in end of the cylinder so that proper mixing will be effected. When the popcorn and candy have been properly mixed as a result of the operation of the agitators or stirrers within the heated cylinder, the doors 8 and 9 may be opened to discharge or permit the removal of the contents of the cylinder.

A stationary plate 29 is provided to close the opening necessarily formed in the lower edge of the door 8 as a result of the presence of the bearing 15.

From the foregoing it will be seen that my invention satisfactorily serves all of its intended purposes. The machine is of a strong and efficient construction and is easily assembled and operated. A uniform mixing of the popcorn and candy is effected without crushing the popcorn so that the product is of superior quality.

I do not restrict myself to unessential features of limitation, nor otherwise specifically, except as set forth in the appended claims.

What I claim and desire to secure by Letters Patent, is:—

1. A machine of the character described comprising a cylinder of relatively large diameter, having an inlet opening near one end, a screw agitator of relatively small diameter extending axially through the cylinder for moving the material toward the inlet end of the cylinder, a series of agitator strips supported within the cylinder near the cylinder wall for moving the material toward the discharge end of the cylinder, said agitator strips being wholly disconnected from the screw agitator and spaced widely therefrom throughout their length, mechanism for operating the screw agitator and the agitator strips simultaneously to move the material as aforesaid, an end wall portion at the end of the cylinder opposite from said opening, and a door forming the remainder of the end wall of the cylinder and arranged to be opened to permit removal of the material from the cylinder.

2. A machine of the character described comprising a cylinder of relatively large diameter having a feeding-in opening near one end and an upper end wall portion at the opposite end, a screw agitator of relatively small diameter supported axially within the cylinder for moving the central part of the material toward the feeding-in end of the cylinder, a series of agitator strips having thin forward edges supported within the cylinder near the cylinder wall for moving the outer portions of the material toward the discharge end of the cylinder, a discharge door hinged at the discharge end of the cylinder and cooperating with said upper end wall portion to form an end wall, and means for operating the agitators simultaneously to move the inner and outer portions of the material simultaneously toward the opposite ends of the cylinder as aforesaid.

3. A machine of the character described comprising a cylinder of relatively large diameter, a screw agitator of relatively small diameter extending axially through the cylinder for moving the material toward one end of the cylinder, a series of thin agitator strips supported within the cylinder near the cylinder wall and being widely spaced from the screw agitator, a series of rings encircling the screw agitator and connected with said strips, means for operating said agitators simultaneously to move the inner and outer portions of the material simultaneously toward opposite ends of the cylinder, and a heat confining wall surrounding the cylinder and forming a space open to atmosphere at both ends of the cylinder.

4. A machine of the character described, comprising a cylinder of relatively large diameter, a screw agitator of relatively small diameter supported axially within the cylinder for moving the material toward one end of the cylinder, a series of agitator strips supported within the cylinder near the cylinder wall for moving the outer portions of the material toward the opposite end of the cylinder, said agitator strips being widely spaced and wholly disconnected from the screw agitator throughout their length, and mechanism for operating the screw agitator and the agitator strips simultaneously to move the material as aforesaid.

ADDISON BISHOP.